United States Patent [19]

McSherry et al.

[11] Patent Number: 4,878,790
[45] Date of Patent: Nov. 7, 1989

[54] EXPANSIBLE FASTENING ELEMENT

[75] Inventors: Thomas W. McSherry, Stamford, Conn.; Nathaniel H. Garfield, Harrison, N.Y.

[73] Assignee: Mechanical Plastics Corp., Pleasantville, N.Y.

[21] Appl. No.: 718,920

[22] Filed: Apr. 2, 1985

[51] Int. Cl.$^4$ ............................................. F16B 13/04
[52] U.S. Cl. ..................................... 411/34; 411/340; 411/344
[58] Field of Search ................. 411/55, 15, 340, 341, 411/342, 343, 344, 345, 346, 363, 913, 34–38, 57, 60, 908

[56] References Cited

U.S. PATENT DOCUMENTS

| 2,398,784 | 4/1946 | Gisondi | 411/363 |
|---|---|---|---|
| 3,213,746 | 10/1965 | Dwyer | 411/15 |
| 3,313,083 | 4/1967 | Flora | 52/717 |
| 3,651,734 | 3/1972 | McSherry | 411/15 |
| 4,181,061 | 1/1980 | McSherry | 411/55 |
| 4,197,781 | 4/1980 | Giannuzzi | 411/341 |
| 4,221,154 | 9/1980 | McSherry | 411/34 |
| 4,274,324 | 6/1981 | Giannuzzi | 411/38 |
| 4,289,062 | 9/1981 | Schiefer | 411/34 |
| 4,377,358 | 3/1983 | Wollar | 411/15 |
| 4,415,299 | 11/1983 | Smith | 411/340 |
| 4,462,729 | 7/1984 | Uhlig | 411/15 |
| 4,499,636 | 2/1985 | Tanaka | 411/15 X |
| 4,712,956 | 12/1987 | Bond et al. | 411/34 X |

FOREIGN PATENT DOCUMENTS

| 212600 | 7/1956 | Australia | 411/38 |
|---|---|---|---|
| 506608 | 9/1930 | Fed. Rep. of Germany | 411/344 |
| 1143372 | 4/1957 | France | 411/55 |
| 1505595 | 3/1978 | United Kingdom | 411/38 |

Primary Examiner—Lloyd A. Gall
Attorney, Agent, or Firm—Israel Nissenbaum

[57] ABSTRACT

An expansible plastic fastener comprising a generally elongated body portion, a collar member, and locking means comprising a pair of reinforced toggle arms. The body portion has a generally central opening for reception of an elongated retaining element. The reinforcement provides cooperative resilient interaction with the toggle arms to assist movements toward their collapsed and expanded portions while simultaneously contributing to their holding strength. The fastener can also include a Y-shaped reinforcing portion pivotally connected to the locking means of the body portion by flexible connector means. This Y-shaped portion may include means for engaging an elongated retaining element in the form of a threaded member. Also, a fastening kit comprising a fastener of the invention along with a key for expanding the locking means to its optimum expanded position or a fastener of the invention with an elongated retaining element.

14 Claims, 8 Drawing Sheets

FIG. 1
FIG. 2
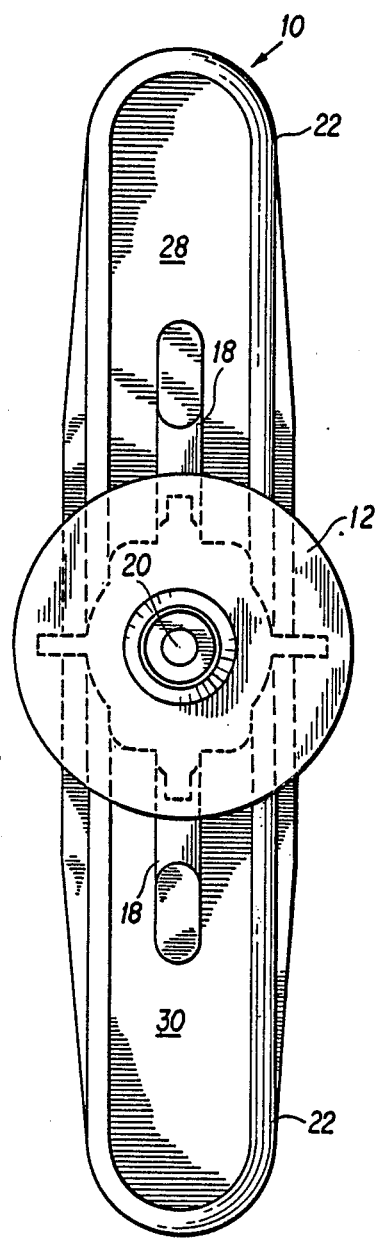
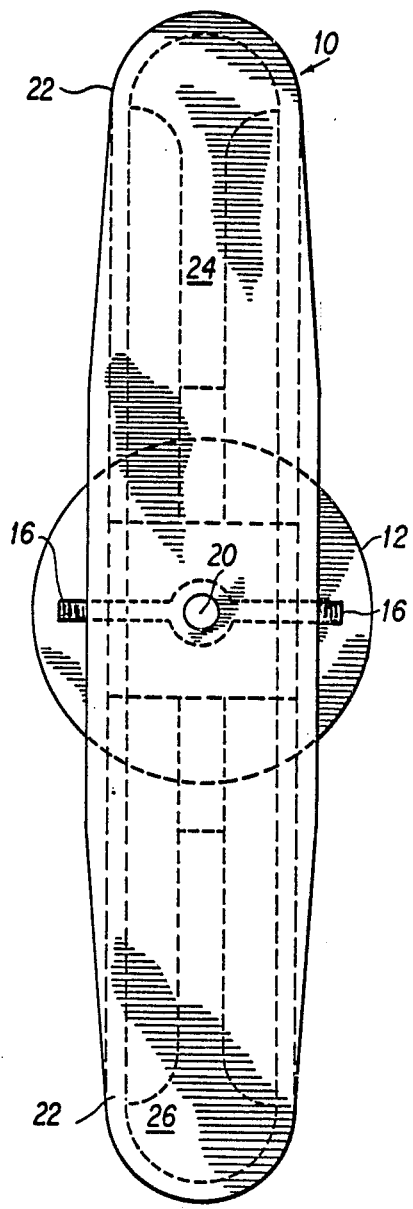

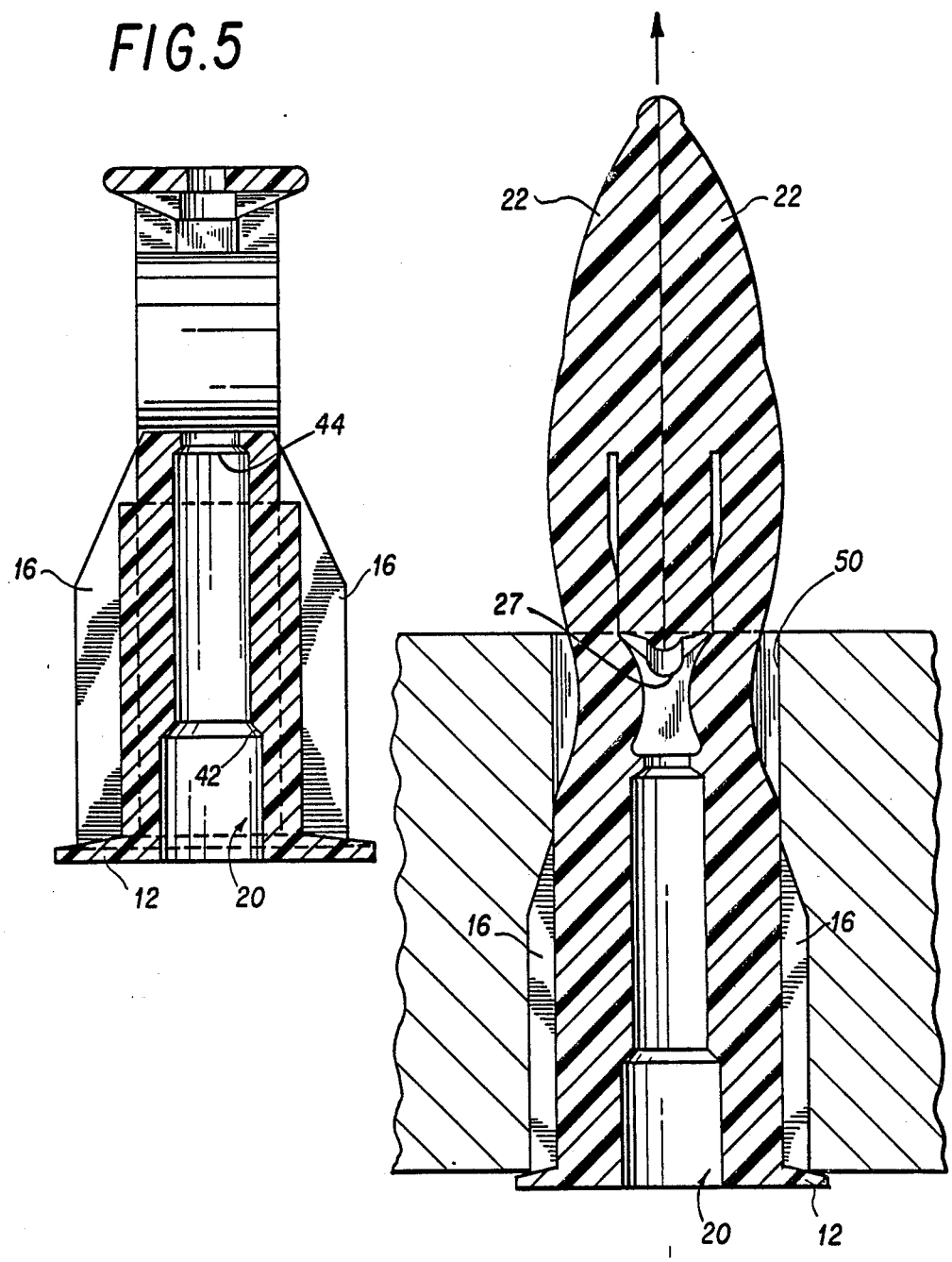

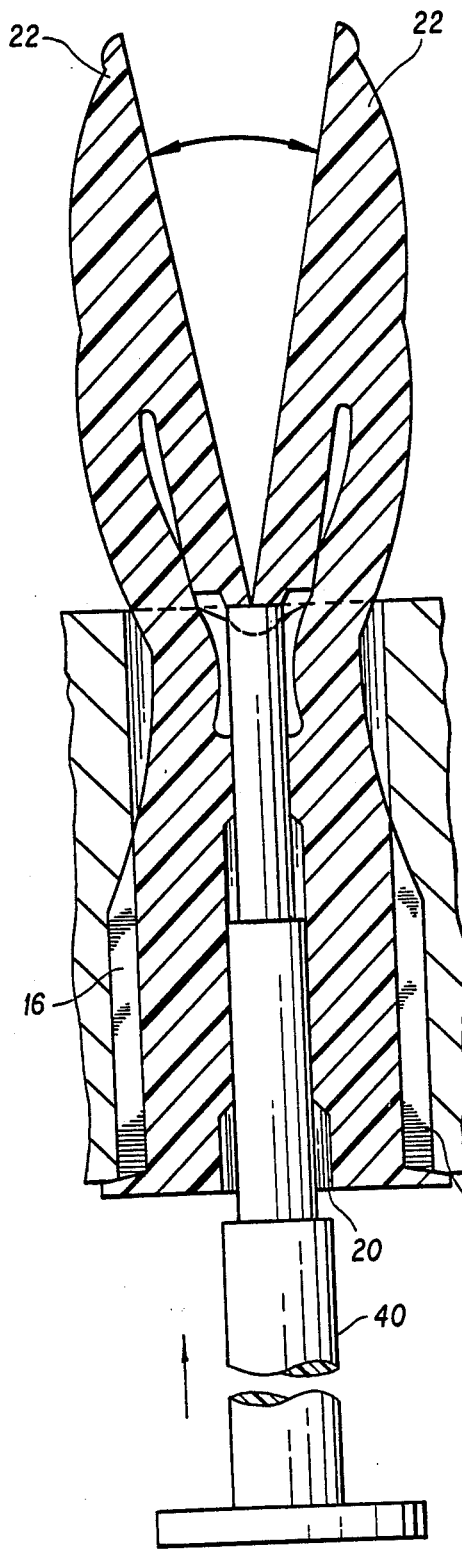
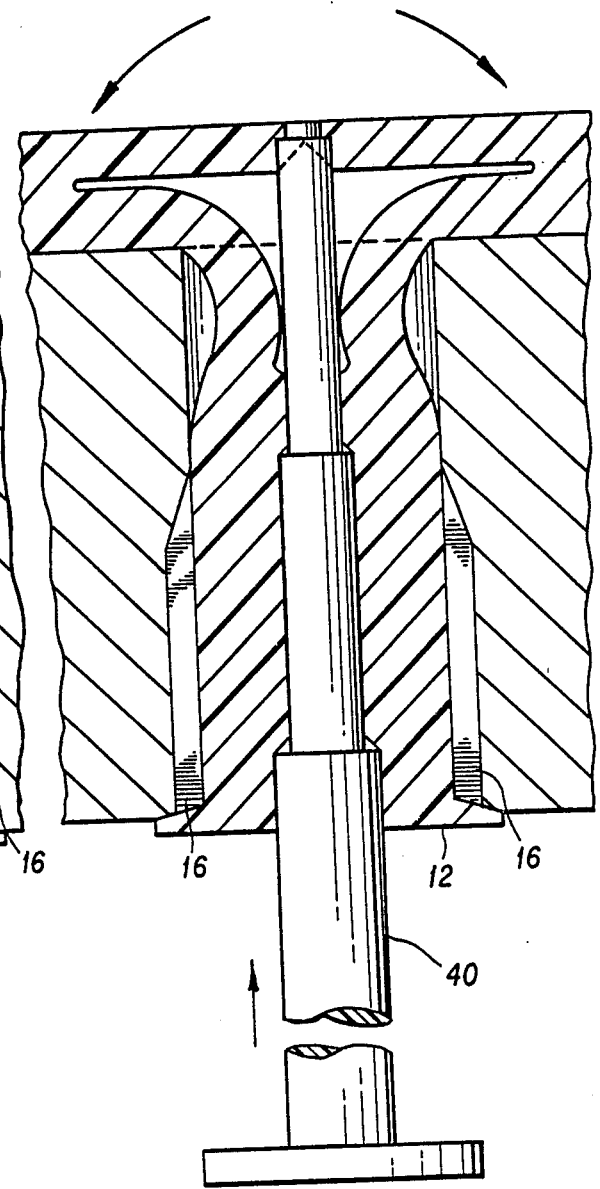
FIG. 7
FIG. 8

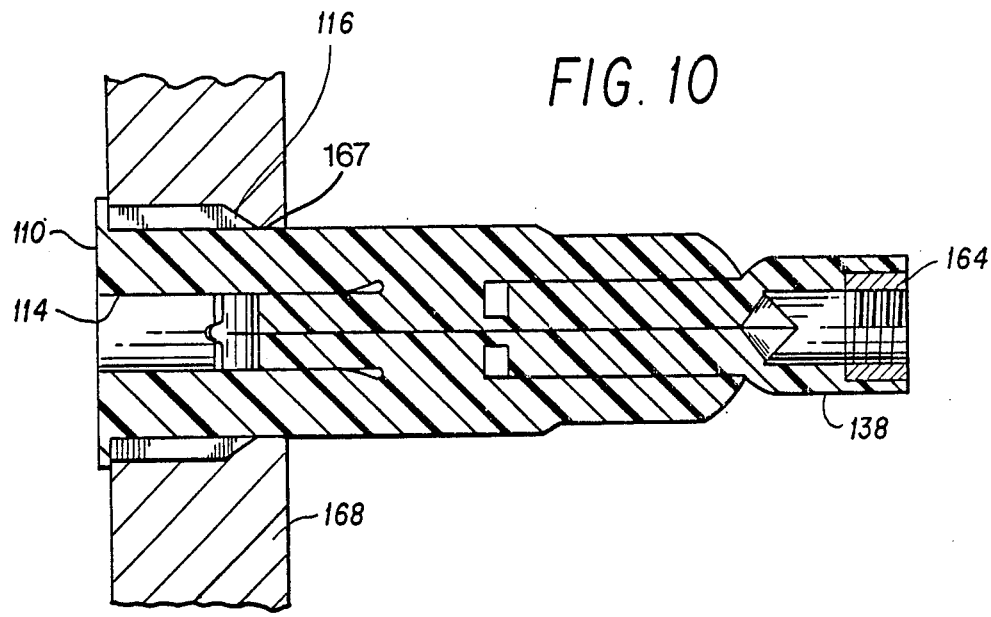
FIG. 10
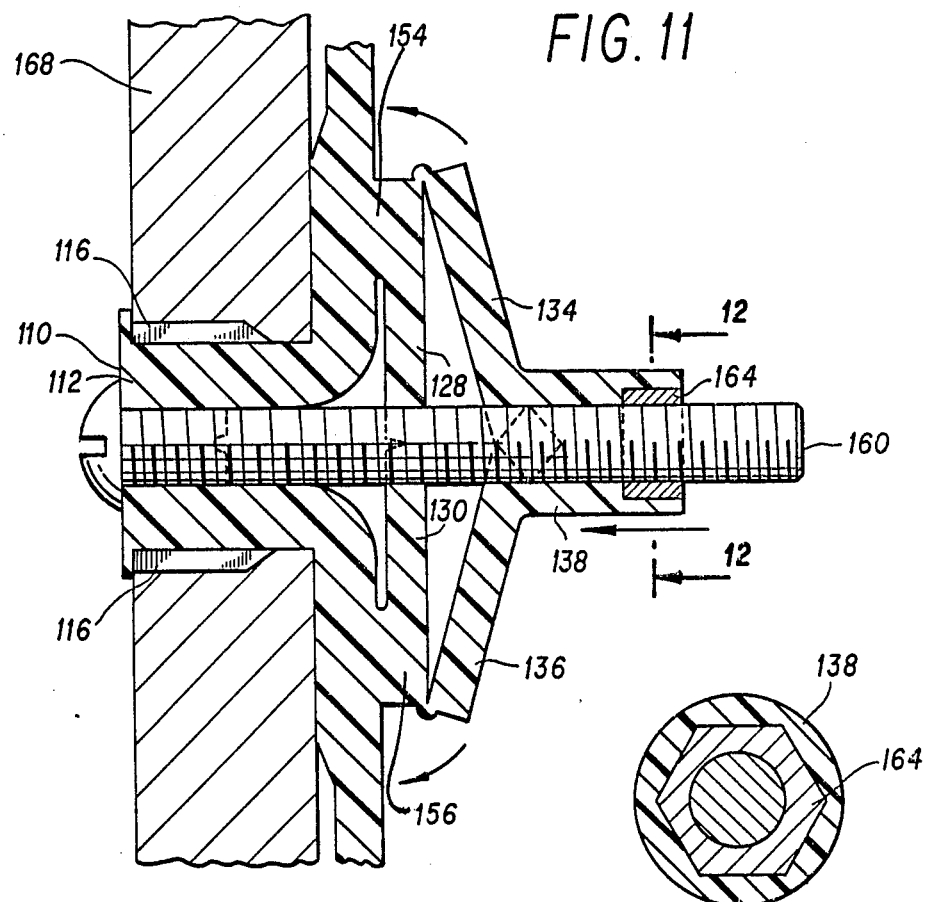
FIG. 11
FIG. 12

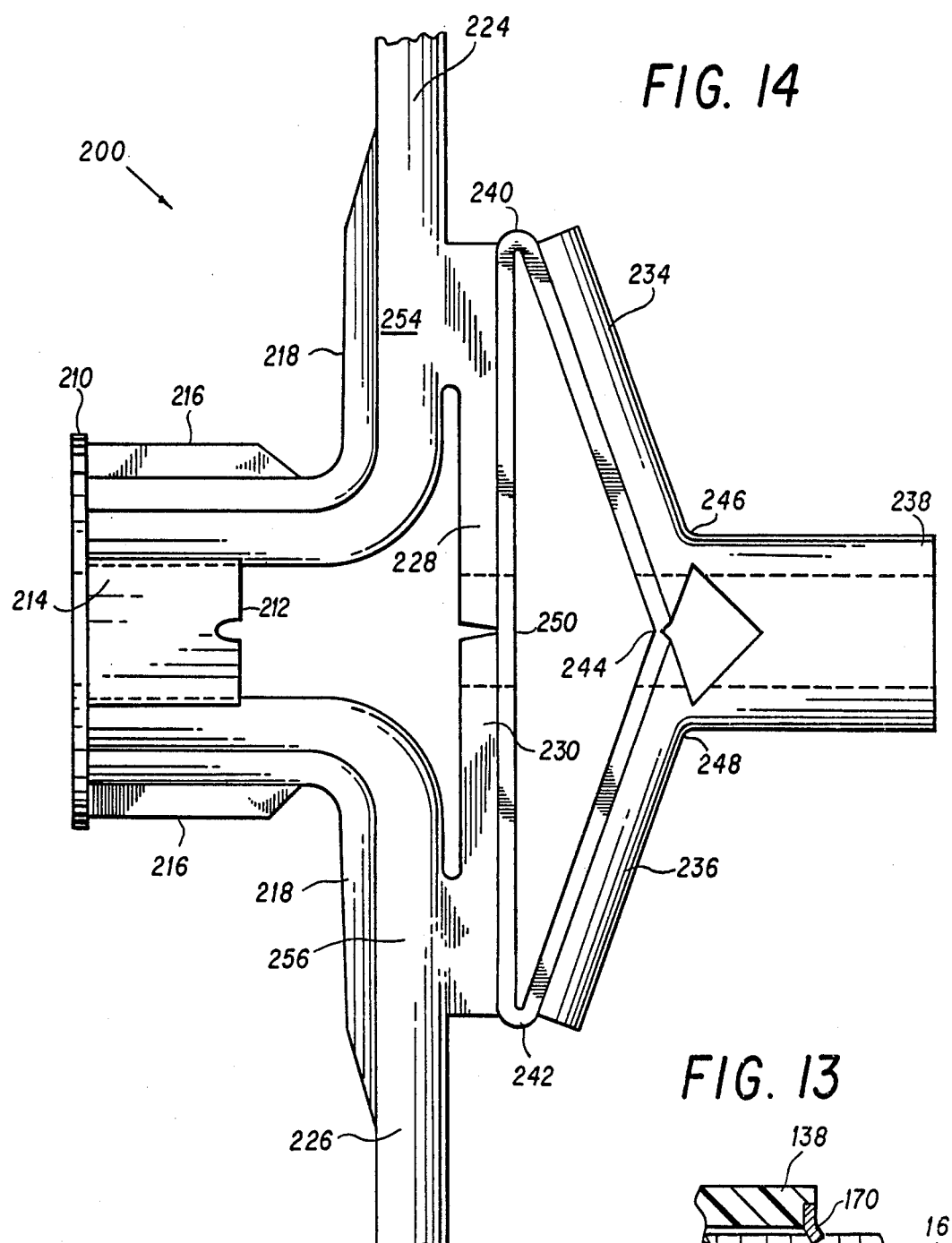

EXPANSIBLE FASTENING ELEMENT

TECHNICAL FIELD

This invention relates generally to fasteners and more particularly to an integrally molded plastic fastening element having an expansible toggle lock for enhanced load bearing capabilities and ease of manufacture.

BACKGROUND ART

Integrally molded plastic fastening elements of the types disclosed in U.S. Pat. Nos. 3,651,734 and 4,181,061 continue to gain commercial acceptance both here and abroad. These fastening elements comprise, in substance, a head for disposition at the end of an opening, typically a hole in a hollow wall, expansible locking means for location at the other end of the opening, and flexible, spaced apart connectors extending therebetween.

These fastening elements utilize relatively long connectors or legs which are expanded radially outward far beyond the edges of the opening when the fastening element is in its expanded locking position. Specifically, the locking means typically comprises a pair of toggle members pivotally connected together at their adjacent ends so that they are movable between a collapsed portion in which they can be inserted through an opening and an expanded position in which they secure the fastener within the opening. The connector elements or legs are joined to the toggle members at such locations on the toggle members that when the toggle members are moved into an expanded position, the connectors are forced relatively far radially outward from their radial location in the collapsed condition so that they extend radially outward far beyond the edges of the opening. U.S. Pat. No. 4,181,061, discloses an integrally molded plastic fastening element comprising a head portion, a longitudinally extending body portion having a pair of longitudinally extending pillar-like parts, and a pair of substantially rigid locking arms pivotally connected to each other at their adjacent ends. These rigid arms are pivotally connected to the body portion at the ends of the respective pillar-like parts at positions radially adjacent to the cross-section of the body so that the rigid arms bear the bulk of the load applied to the fastener. The advantages of this structure over U.S. Pat. No. 3,651,734 include enhanced load bearing capability and simplicity of structure. While the fastening elements of both previously cited patents have proved highly satisfactorily for a wide range of applications, the present invention is directed to a device having improved features relating to the modification of the connection of the expansible locking means to the other end of the fastening element.

SUMMARY OF THE INVENTION

The invention relates to an expansible plastic fastener, for securement within an opening defined by structural means, which comprises a generally elongated body portion defining a generally central opening for reception of an elongated retaining element.

A collar member is formed integrally with one end of the body portion and has a flanged portion extending in a generally radially outward direction. Locking means are also connected to the body portion. These locking means are movable between a collapsed position for insertion into such opening and an expanded position in which they prevent removal of the body portion out of such opening.

The locking means comprises a pair of substantially rigid toggle arms pivotally connected to the body portion. The toggle arms are pivotally connected to each other by flexible integral strap means which intersects the central longitudinal axis of the body portion. The toggle arms each have an integrally formed reinforcing rib of a width less than the average width of the toggle arm and positioned generally centrally with respect to the width of the toggle arm. These reinforcing ribs extend at least over a portion of the toggle arms and onto the body portion past the first mentioned pivotal connection. The toggle arms are pivotally movable toward and away from each other between respective collapsed and expanded positions such that the reinforcing ribs provide cooperative resilient interaction with the toggle arms to thereby assist movements toward their collapsed and expanded portions, while simultaneously contributing to their holding strength.

Preferably, the toggle arms are pivotally connected to the body portions at radial locations substantially adjacent to or within the radius of the body portion.

To prevent the removal of the body portion out of the opening, the locking means is configured and dimensioned to cooperate with an elongated retaining element inserted into the collar member.

The fastener according to the invention may also include means to prevent rotation of said fastener when said elongated retaining element is inserted. This helps secure the fastener to a structural member such as a wall, ceiling, floor, or the like. Preferably, the means to prevent rotation is at least one elongated fin member integrally attached to the body member and extending radially outward therefrom for engagement with the structural means. The generally elongated body portion of the fastener defines at least one substantially rigid protuberance extending internally of this opening for engaging the elongated retaining element. This protuberance may be at least one stepped portion, and one preferred elongated retaining element is a screw.

An alternate embodiment of the invention relates to an expansible plastic fastener as described above which further includes a generally Y shaped reinforcing portion pivotally connected to the locking means of the body portion by first flexible connector means. This Y shaped reinforced member comprises a generally elongated body portion defining a generally central opening for reception of the elongated retaining element and a pair of reinforcing members pivotally connected at one end to the body portion of the Y shaped reinforcing portion by second flexible connector means.

The reinforcing members are also connected at one end to each other by flexible integral strap means which intersects the central longitudinal axis of the body portion. These reinforcing members are pivotally connected at their opposite ends to the toggle arms by the first flexible connector means.

In operation, the reinforcing members and the toggle arms are pivotally movable toward and away from each other between respective collapsed and expanded positions such that the reinforcing ribs and reinforcing members provide cooperative resilient interaction with the toggle arms to thereby assist movements toward their collapsed and expanded portions while simultaneously contributing to their holding strength.

The toggle arms and reinforcing members form a triangular configuration when the locking means is in its expanded position.

In this embodiment the elongated retaining element is preferably a threaded member and the body portion of the Y shaped reinforcing portion further comprises means to engage the threaded member. Such means for engagement of the threaded member includes nut means.

Alternatively, the body portions and flexible strap means of the fastener may be configured and positioned for engagement of their elongated retaining elements; such as a threaded screw.

The invention also contemplates a fastener kit which comprises an expansible plastic fastener as described previously and an elongated key configured and dimensioned for insertion into the opening of the body portion and the collar member when the fastener is positioned in such opening defined by the structural means.

The key has at least one protuberance extending outwardly of its longitudinal axis for engagement with the correspondingly located internally extending protuberance of the body portion. The outward dimension of the outwardly projecting protuberance of the key and the inward dimension of the internally projecting protuberance of the body portion being such that insertion of the key into the opening of the body portion causes engagement of the respectively located protuberances and engagement between the end portion of the key and the flexible integral strap of the locking means. Thus, the locking means is assisted in expanding to its optimum expanded position.

Advantageously, at least one protuberance of the opening of the body portion is a multiple stepped portion and the protuberance of the key is a correspondingly dimensioned and configured multiple stepped portion. In a preferred arrangement, at least one protuberance of the opening of the body portion comprises at least two stepped portions and the protuberance of the key comprises at least two corresponding stepped portions dimensioned and configured for engagement with the first mentioned stepped portion. Also, the key includes a stepped end portion and the flexible strap means includes an aperture configured and dimensioned to correspond with the stepped end portion of the key for alignment of the key with the flexible strap means for positive engagement with said locking means.

The invention also relates to other fastener kits which incorporate the fasteners described above along with threaded members or elongated retaining elements for engagement therewith.

BRIEF DESCRIPTION OF THE DRAWINGS

The nature, advantages, and various other additional features of the invention will appear more fully upon consideration of the illustrative embodiment now to be described in detail in connection with the accompanying drawing figures, wherein:

FIG. 1 is a front view of an expansible fastening element according to the invention;

FIG. 2 is a rear view of the fastener of FIG. 1

FIG. 5 is a view partially in cross-section, of the body of the fastener of FIG. 1 taken along lines 5—5 of FIG. 3;

FIG. 6 is a view partially in cross-section of the fastener of FIG. 5 illustrated with the arms in a collapsed position and inserted into an aperture in a wall;

FIG. 7 is an illustration partially in cross-section of the fastener of FIG. 6 illustrating the initial contact of the key and collapsed toggle arms;

FIG. 8 is an illustration partially in cross-section of the fastener of FIG. 7 illustrating the arms in their full expanded position;

FIG. 10 is an illustration partially in cross section of the fastener of FIG. 9 with its arms in a collapsed position and inserted into a hole in a wall;

FIG. 11 is an illustration partially in cross-section of the fastener of FIG. 9 shown with the arms in their expanded position after engagement with a machine bolt;

FIG. 12 is a cross-sectional view of the machine bolt, nut, and end of the fastener of FIG. 11 taken along lines 12—12 of FIG. 11;

FIG. 13 is a cutaway view of an alternate end of a fastener similar to FIG. 9;

FIG. 14 is a side view of an alternate embodiment of the fastener of FIG. 9;

For convenience of reference, the same structural elements in the various drawing figures are designated by the same reference numerals throughout the drawings.

DETAILED DESCRIPTION OF THE PREFERRED EMBODIMENTS

Figure 3:
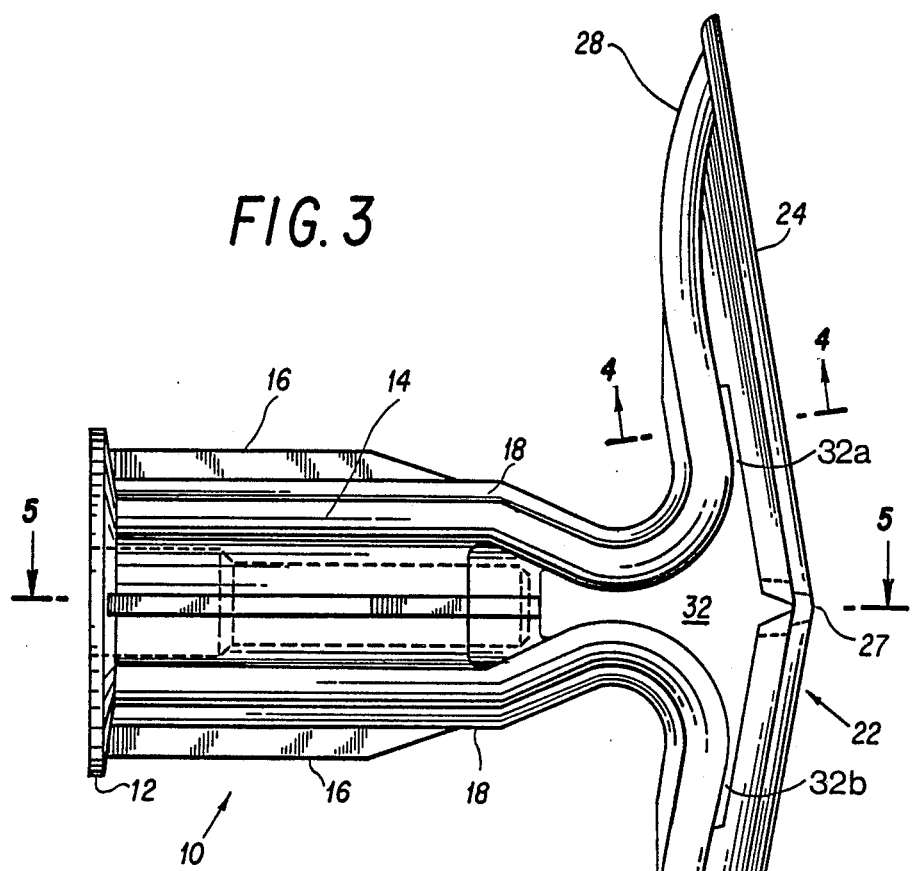
FIG. 3 is a side view of the fastener of FIG. 1.
Figure 4:
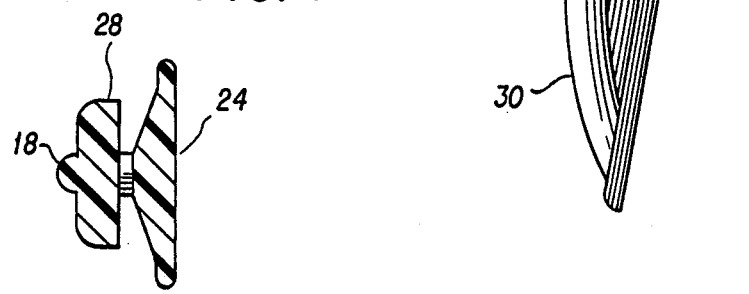
FIG. 4 is a cross-sectional view of illustrating the rib reinforcement of the invention taken along lines 4—4 of FIG. 3.

In accordance with the invention, a molded plastic fastening element 10 with enhanced load bearing capability and strength is provided. The reinforced toggle arms and body of the fastener 10 allow heavier loads to be supported in a more secure fashion within an aperture in a structural element or wall. FIGS. 1-8 illustrate a first embodiment of such a fastening element.

The fastener 10 of FIGS. 1-8 comprises a head 12 of generally disk-like form and a body 14 disposed centrally thereupon and upstanding from the head 12 and locking means 22 described hereinbelow.

The body 14 shown in these FIGS. has a generally circular section. Spaced about the body 14 are anti-rotation fins 16, and in this particular embodiment there are four such fins. Also, the body includes at least two reinforcing ribs 18. These reinforcing ribs extend from the head 12 to the arms of the locking means. Extending through the head 12 and through the body 14 is a central passage 20.

The expansible locking means 22 includes first and second strap members 24 and 26, pivotal connecting joint 27 and first and second toggle connecting arms 28 and 30.

The various parts of the fastener are integrally formed together from a resilient plastic material typically by injection molding. Suitable materials for construction of the fastener include polypropylene, polyethylene and nylon as well as a wide variety of other materials which may be chosen with consideration to the fastener configuration, the manner of formation, and the intended use.

The expansible locking means 22 is integrally connected to the body portion 14 and is provided to secure the fastener within an opening such as a wall opening. More specifically, toggle arms 28 and 30 are joined to the bottom wall of body portion 14 and extend downward and outward therefrom. The lateral ends of strap members 24 and 26 are connected to the bottom outward ends of toggle arms 28 and 30, respectively, with spacings 32a and 32b between arms 24 & 28 and 26 & 30, respectively. Strap members 24 and 26 extend transversely across the bottom of the fastener and the centrally located end portions of these toggle arms are joined together by an integral pivotal connection 27. This pivotal connection 27 has a reduced thickness in comparison to the thickness of the strap members 24 and 26, and forms a small centrally located opening that is longitudinally aligned with the central bore of the body portion 14. Toggle arms 28 and 30 also contain the reinforcing ribs 18 primarily to reinforce the portion of the arms which are to be bent and this in turn provides additional strength to the fastener. These toggle arms 28 and 30 are spaced apart laterally to define a central open area 32 into which the pivotal connection 27 and centrally located end portions of strap members 24 and 26 move when the locking means are collapsed.

To lock the fastener within an opening, strap members 24 and 26 are squeezed together into their collapsed position between toggle arms 28 and 30. The fastener is then inserted through the opening while in its collapsed positions. Once inserted, toggle arms 28 and 30 flex outward due to their inherent resiliency which resiliency is enhanced due to the presence of the reinforcing ribs 18. This flexing tend to pull the strap members 24, 26 toward their expanded over-center position. In the event the toggle arms 28 and 30 do not completely force strap members 24 and 26 into their over-center position, a key member 40 is provided for insertion into the central passage 20 of the body 14 to push the strap members 24, 26 outward into their proper expanded position.

Referring to FIGS. 5–8, cross-sectional views of the fastener as shown illustrate the bore of the fastener and key member as well as the compressing and expanding operation of the locking means 22. Referring initially to FIG. 5, the fastener body contains a generally elongated bore 20 having stepped portions 42 and 44. FIG. 6 illustrates the fastener in a collapsed position as initially inserted into hole 50. Upon insertion into the hole, the toggle arms 28, 30, and the strap members 24, 26 of the locking means 22 initially begin to return to their original position, as is shown in FIG. 7. To assist the strap members 24, 26 in achieving the proper over-center position, key member 40 is inserted into bore 20 of the fastener. Key 40 contacts pivot point 27 which in turn transmits a force to spread apart the strap members 24, 26. FIG. 8 shows that complete insertion of the key 40 into the bore precisely positions the toggle arms in the proper overcenter position, since the key cannot be inserted past the stepped portions 42 and 44 of the bore. This prevents the key from being inserted too far so as to over-stress the strap members 24, 26 past their proper overcenter position, a situation which would weaken the overall holding power of the fastener.

Figure 9:
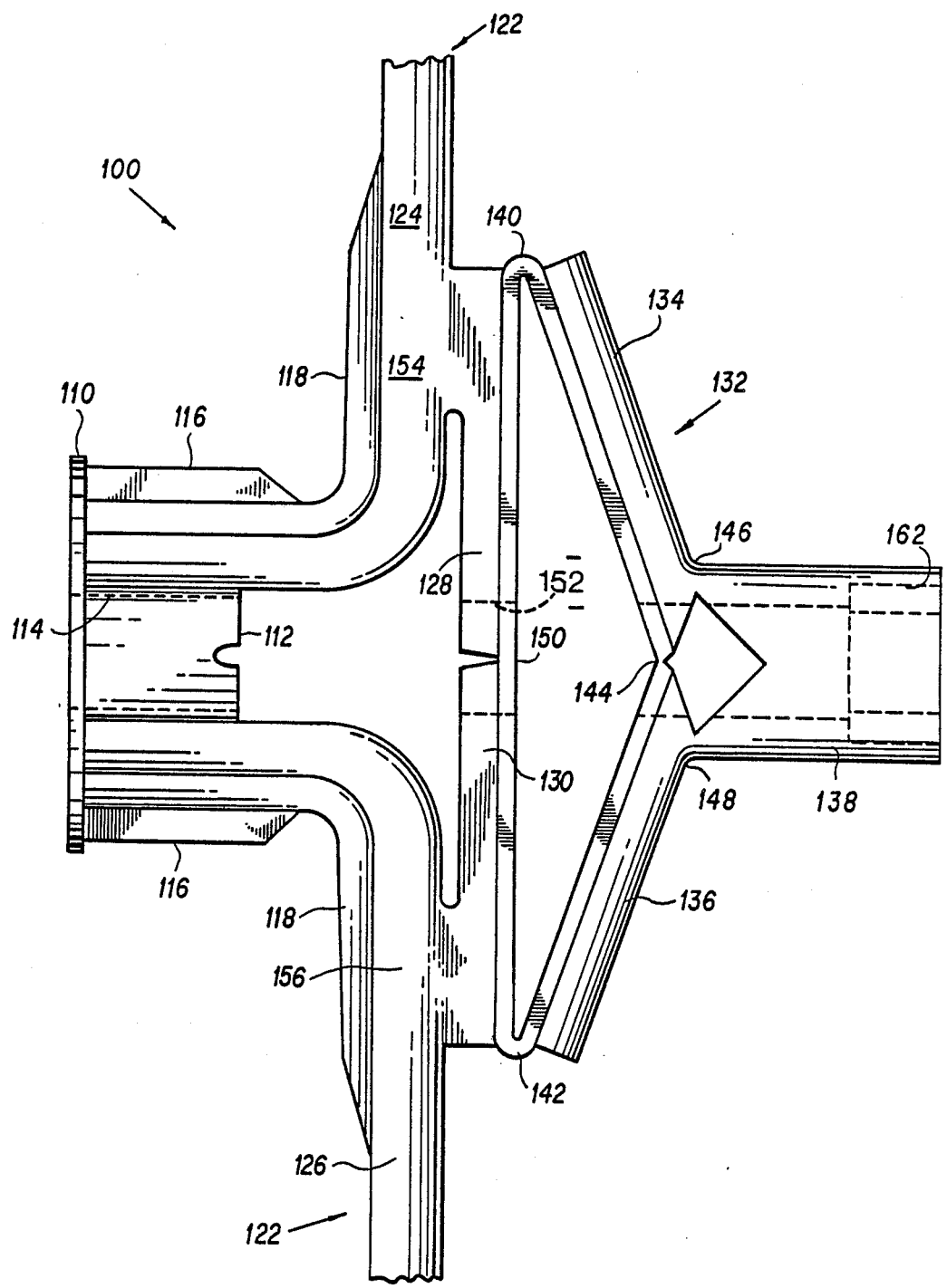
FIG. 9 is a side view of a second expansible fastening element according to the invention.

FIGS. 9–11 illustrate an alternate embodiment of the invention. In this embodiment the fastener 100 comprises a head 110 of generally disk-like form and a body 112 disposed centrally thereupon and upstanding from the head 110 to the locking means 122. Body 112 is of generally circular section and has a central passage 114 passing therethrough. The body 112 also includes anti-rotation fins 116 and reinforcing ribs 118 which extend from the body to the locking means 122. The toggle arms 124 and 126 of the locking means 122 are similar to the toggle arms 28, 30 of the first embodiment of the invention. Strap members 128 and 130 however, are different from the corresponding strap members 24, 26 of the first embodiment in that they are reinforced with a Y shaped structure 132.

This Y shaped reinforcing structure comprises reinforcing arms 134 and 136 which are connected together at one end at 144, as well as to a cylindrical extension 138 at the same end. Reinforcing arms 134 and 136 are connected at their opposite other ends to strap members 128 and 130 at pivoting joints 140 and 142, respectively. The connection between arms 134 and 136 is also a pivoting joint 144 as is the connection between the arms 134 and 136 and cylindrical extension 138. These connections are labeled 146 and 148, respectively.

Similar to the first embodiment of the invention, strap members 128 and 130 have pivoting point 150 which includes a aperture 152 therethrough.

As shown in FIGS. 9–11, strap members 128 and 130 are firmly secured to toggle arms 124 and 126 by a non-pivoting joint 154, 156.

The central passage through the fastener 114 is of the same diameter through disk-like head 110, body 112, strap members 128, 130, reinforcing arms 134, 136, and cylindrical extension 138 to allow for the insertion of a machine bolt 160. As shown in FIGS. 9–12, the cylindrical extension 138 is provided with a space 162 for insertion of nut 164. FIG. 10 shows the fastener 100 in the collapsed position as inserted into a hole 167 in a structure or wall 168. After insertion into this hole 167, the toggle arms 124, 126, strap members 128, 130, and reinforcing arms 134, 136 return toward their original uncollapsed position, thereby properly aligning the fastener for reception of the machine bolt 160. As shown in FIG. 11, the machine bolt then passes through the various parts of the fastener to matingly engage with nut 164. In this embodiment of the invention, by tightening the machine bolt through the nut, the fastener provides extremely high strength such that heavy or large objects can be securely and rigidly fastened to the wall 168.

FIG. 13 illustrates an alternate means for engaging machine bolt 160, shown in the form of a Tinnemann nut 170. The remainder of the fastener is essentially the same as in FIGS. 9–12.

Figure 15:
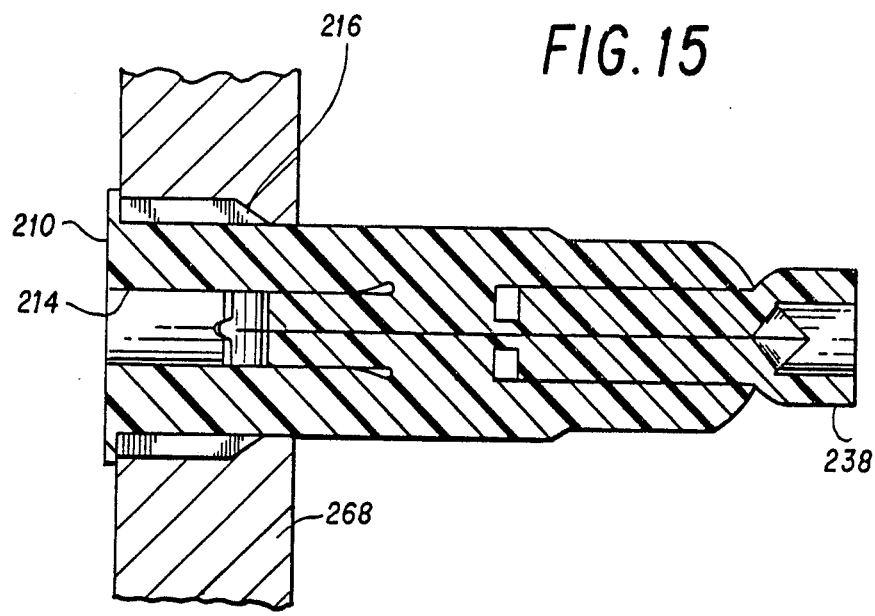
FIG. 15 is a view partially in cross section of the fastener of FIG. 14 with the arms in a collapsed position and inserted into a hole in a wall.
Figure 16:
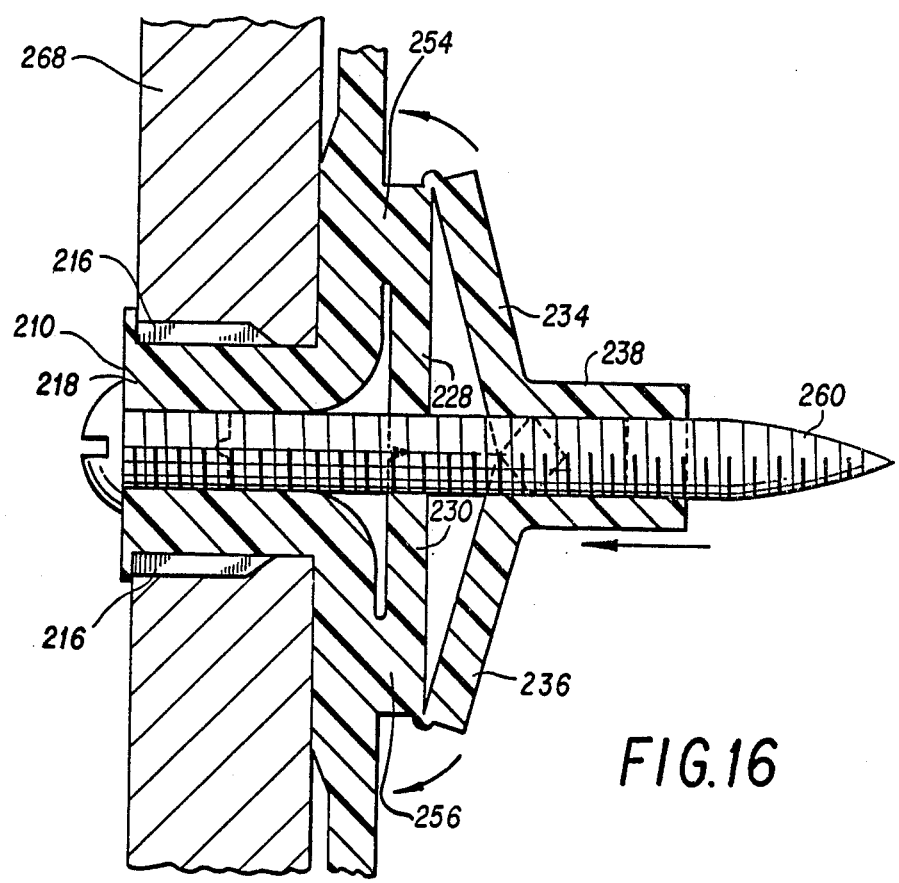
FIG. 16 is a view partially in cross section of the fastener of FIG. 15 shown engaged with a self-tapping screw and the arms moved to an expanded position.

In a third embodiment of the invention, as shown in FIGS. 14–16, a high strength fastener 200 is also provided which is very similar to the second embodiment of the invention. Elements of this fastener which are the same as the embodiment of FIGS. 9–12 are identified by a 200 series of like numbers to the 100 series of the previous embodiment. In this embodiment, cylindrical extension 238 does not contain a nut or any other means of securement. Instead, cylindrical extension 238 and central passage 214 are smaller in diameter than in the previous fastener 100. This allows for insertion of a self-threading screw 260 which engages the fastener at five points: disk-like head 210, body 212, strap members 228, 230, reinforcing arms 234, 236, and cylindrical extension 238. By tightening the self-threading screw 260 the assembly can be again rigidly secured to a wall member 268 for securing large or heavy objects or the like.

The reinforcing rib on the parting line of the fastening element of the invention increases the cross-sectional area by a significant amount. Furthermore, the tensile strength of the fastener is increased in direct proportion to the increase in the cross-sectional area.

With respect to inserting the fastening element into the hole in the wall or other objects, the unique fastening element provides space for the anti-rotation elements when the reinforcing ribs are hammered into the hole.

The stepped plunger key 40 is important for installing the fastening elements of the invention in a proper manner. As mentioned above, the steps on the shank of the key act as stops or forced termination points to prevent overstressing of the anchors when opening the connecting means and expansible locking elements.

While it is apparent that the invention herein disclosed is well calculated to fulfill the objects above stated, it will be appreciated that numerous modifications and embodiments may be devised by those skilled in the art, and it is intended that the appended claims cover all such modifications and embodiments as fall within the true spirit and scope of the present invention.

We claim:

1. An expansible plastic fastener for securement within an aperture defined by structural means which comprises:
    (a) a generally elongated body portion defining a generally central opening for reception of an elongated retaining element;
    (b) a collar member formed integrally with one end of said body portion and having a flanged portion extending in a generally radially outward direction; and
    (c) locking means connected to said body portion and movable between a collapsed position for insertion into such aperture and an expanded position in which said locking means prevents removal of the body portion out of such aperture by engagement of said locking means with said structural means beyond the edges of said aperture,
    said locking means comprising a pair of substantially rigid toggle arms pivotally connected to said body portion and extending transversely with respect thereto in said expanded position, and wherein said pivotal connection permits said movement between said collapsed position, wherein said toggle arms move toward each other, and said expanded position, said toggle arms further being pivotally connected to each other by flexible integral strap means which intersects the central longitudinal axis of said body portion, with the flexible integral strap means being connected to the toggle arms at a distance from the central longitudinal axis such that the toggle arms are longitudinally spaced from the strap means,
    said toggle arms each having an integrally formed plastic reinforcing rib integrally molded thereon, if a width less than the average width of the toggle arm and positioned generally centrally with respect to the width of said toggle arm and extending over a portion of said toggle arm, parallel to said longitudinal spacing along a planar portion of said arm, and onto said body portion past said first mentioned pivotal connection, with said first mentioned pivotal connection being reinforced by said rib,
    said toggle arms being pivotally movable toward and away from each other between respective collapsed and expanded positions with said reinforcing ribs assisting movements toward their expanded positions, while simultaneously contributing to their holding strength when said toggle arms are in said expanded position.

2. The fastener according to claim 1 wherein said toggle arms are pivotally connected to said body portions at radial locations substantially adjacent to or within the radius of said body portion.

3. The fastener according to claim 1 wherein said locking means is configured and dimensioned to prevent the removal of the body portion out of said aperture by said locking means cooperating with an elongated retaining element inserted into said collar member.

4. The fastener according to claim 1 further comprising means to prevent rotation of said fastener when said elongated retaining element is inserted.

5. The fastener according to claim 4 wherein said structural means is a structural member such as a wall, ceiling, floor, or the like, and said means to prevent rotation is at least one elongated fin member integrally attached to said body member and extending radially outward therefrom for engagement with said structural means.

6. The fastener according to claim 1 wherein said generally elongated body portion defines at least one substantially rigid protuberance extending internally of said opening for engaging said elongated retaining element.

7. A fastener according to claim 6 wherein said protuberance is at least one stepped portion and said elongated retaining element is a screw.

8. A fastener kit which comprises:
    (a) the fastener of claim 6; and
    (b) a threaded member for engagement therewith.

9. A fastener kit which comprises:
    (a) the fastener of claim 1; and
    (b) an elongated retaining element for engagement therewith.

10. A fastener kit which comprises:
    (a) an expansible plastic fastener for securement within an aperture defined by structural means which comprises:
        (i) a generally elongated body portion defining a generally central opening for reception of an elongated retaining element;
        (ii) a collar member formed integrally with one end of said body portion and having a flanged portion extending in a generally radially outward direction; and
        (iii) locking means connected to said body portion and movable between a collapsed position for insertion into such aperture and an expanded position in which said locking means prevents removal of the said body portion out of such aperture by engagement of said locking means with said structural means beyond the edges of said aperture,
        said locking means comprising a pair of substantially rigid toggle arms pivotally connected to said body portion and extending transversely with respect thereto in said expanded position, and wherein said pivotal connection permits said movement between said collapsed position, wherein said toggle arms move toward each other, and said expanded position, said toggle arms further being pivotally connected to each other by flexible integral strap means which intersects the central longitudinal axis of said body portion, with the flexible integral strap means being connected to the toggle arms at a distance from the central longitudinal axis such that the toggle arms are longitudinally spaced from the strap means, said toggle arms each having an integrally formed plastic reinforcing rib integrally molded thereon, of a width less than the average width of the toggle arm and positioned generally centrally with respect to the width of said toggle arm and extending over a portion of said toggle arm, parallel to said longitudinal spacing along a planar portion of said arm, and onto said body portion past said first mentioned pivotal connection, with said first mentioned pivotal connection being reinforced by said rib, said toggle arms being pivotally movable toward and away from each other between respective collapsed and expanded positions with said reinforcing ribs assisting movements toward their expanded positions, while simultaneously contributing to their holding strength when said toggle arms are in said expanded position; and (b) elongated plunger key configured and dimensioned for insertion into said opening of said body portion and said collar member when said fastener is positioned in such aperture defined by the structural means, the inserting end of said key having a stepped configuration for engagement with a correspondingly located internally extending stepped configuration of said opening of said body portion, the inward dimension of said stepped portion of said opening of said body portion and the outward dimension of said stepped portion of the inserting end of said key being such that plunging insertion of said key into said opening of said body portion causes engagement of said respectively located stepped portions and engagement between the end portion of said key and said flexible integral strap means of said locking means, whereby said locking means is assisted in expanding to its optimum expanded position, for reception of said elongated retaining element, and whereby said protuberance prevent said key from being inserted to an extent whereby said flexible strap means is overstressed.

11. A fastener kit which comprises:
(a) an expansible plastic fastener for securement within an aperture defined by structural means which comprises:
  (i) a generally elongated body portion defining a generally central opening for reception of an elongated retaining element,
    said opening defining at least one substantially rigid protuberance extending internally of said opening;
  (ii) a collar member formed integrally with one end of said body portion and having a flanged portion extending in a generally radially outward direction; and
  (iii) locking means connected to said body portion and movable between a collapsed position for insertion into such aperture and an expanded position in which said locking means prevents removal of the said body portion out of such aperture by engagement of said locking means with said structural means beyond the edges of said aperture,
    said locking means comprising a pair of substantially rigid toggle arms pivotally connected to said body portion and extending transversely with respect thereto in said expanded position, and wherein said pivotal connection permits said movement between said collapsed position, wherein said toggle arms move toward each other, and said expanded position,
    said toggle arms further being pivotally connected to each other by flexible integral strap means which intersects the central longitudinal axis of said body portion, with the flexible integral strap means being connected to the toggle arms at a distance from the central longitudinal axis such that the toggle arms are longitudinally spaced from the step means,
    said toggle arms each having an integrally formed plastic reinforcing rib integrally molded thereon, of a width less than the average width of the toggle arm and positioned generally centrally with respect to the width of said toggle arm and extending over a portion of said toggle arm, parallel to said longitudinal spacing along a planar portion of said arm, and onto said body portion past said first mentioned pivotal connection, with said first mentioned pivotal connection being reinforced by said rib,
    said toggle arms being pivotally movable toward and away from each other between respective collapsed and expanded positions with said reinforcing ribs assisting movements toward their expanded positions, while simultaneously contributing to their holding strength when said toggle arms are in said expanded position; and
(b) an elongated plunger key configured and dimensioned for insertion into said opening of said body portion and said collar member when said fastener is positioned in such aperture defined by the structural means,
said key having at least one protuberance extending outwardly of its longitudinal axis for engagement with the correspondingly located internally extending protuberance of said body portion,
the outward dimension of said outwardly projecting protuberance of said key and the inward dimension of said internally projecting protuberance of said body portion being such that plunging insertion of said key into said opening of said body portion causes engagement of said respectively located protuberance and engagement between the end portion of said key and said flexible integral strap means of said locking means, whereby said locking means is assisted in expanding to its optimum expanded position, for reception of said elongated retaining element, and whereby said protuberances prevent said key from being inserted to an extent whereby said flexible strap means is overstressed.

12. The fastener kit according to claim 11 wherein said at least one protuberance of said opening of said body portion is a multiple stepped portion and said protuberance of said key is a correspondingly dimensioned and configured multiple stepped portion.

13. The fastener kit according to claim 12 wherein said at least one protuberance of said opening of said body portion comprises at least two stepped portions and said protuberance of said key comprises at least two corresponding stepped portions dimensioned and configured for engagement with the first mentioned stepped portions.

14. The fastener kit according to claim 11 wherein said key further comprises a stepped end portion and said flexible strap means further comprises an aperture configured and dimensioned to correspond with said stepped end portion of said key for alignment of said key with said flexible strap for positive engagement with said locking means.

* * * * *